April 14, 1936. W. FORSTER 2,037,623
TRANSFERENCE OF GLASS BOTTLES, JARS AND THE LIKE TO LEERS
Filed April 20, 1935 7 Sheets-Sheet 1
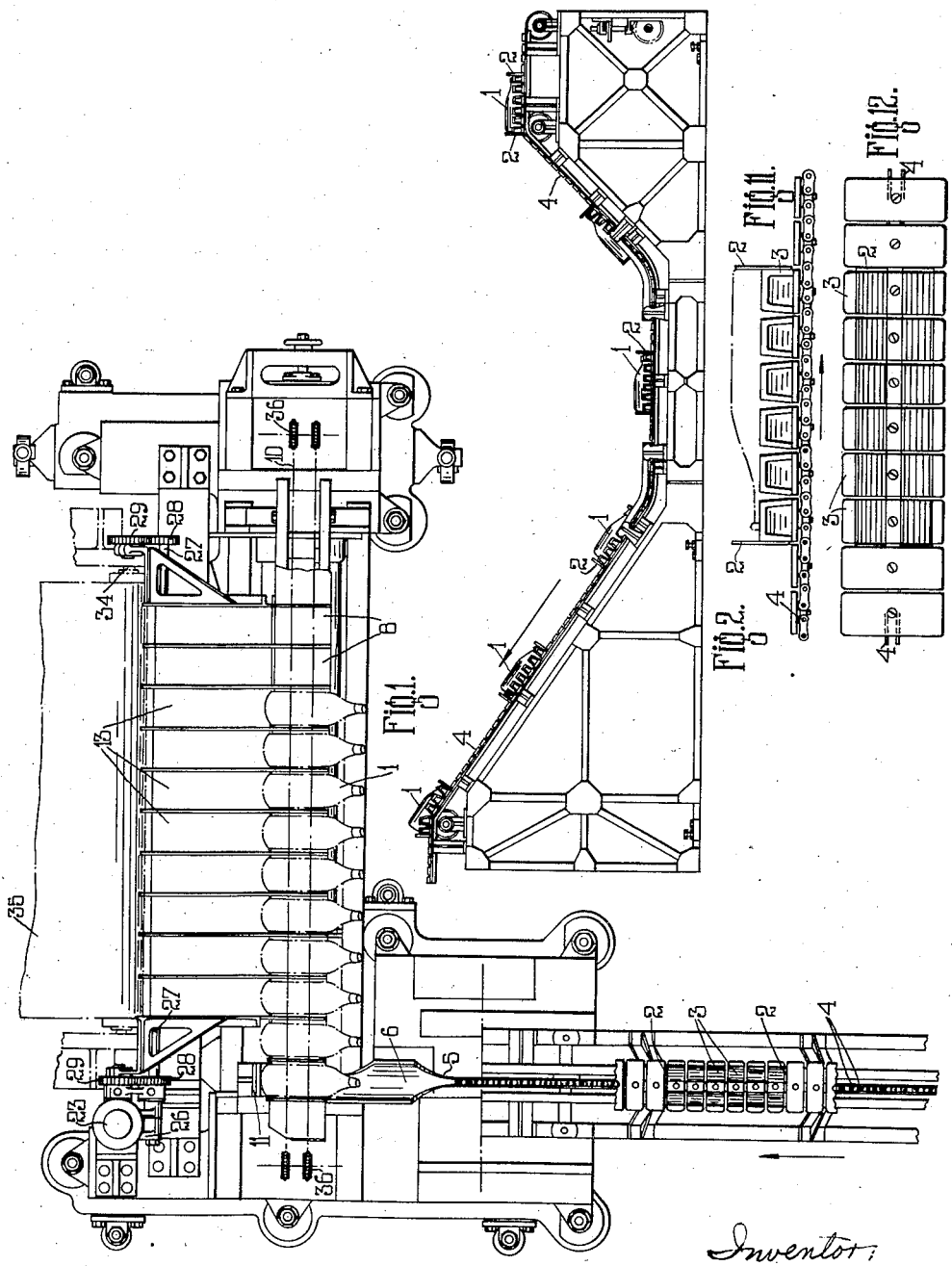
Inventor:
Walter Forster.
By: Mason & Porter
Attorneys.

April 14, 1936.  W. FORSTER  2,037,623

TRANSFERENCE OF GLASS BOTTLES, JARS AND THE LIKE TO LEERS

Filed April 20, 1935  7 Sheets-Sheet 2

Inventor:
Walter Forster
By: Mason & Porter
Attorneys

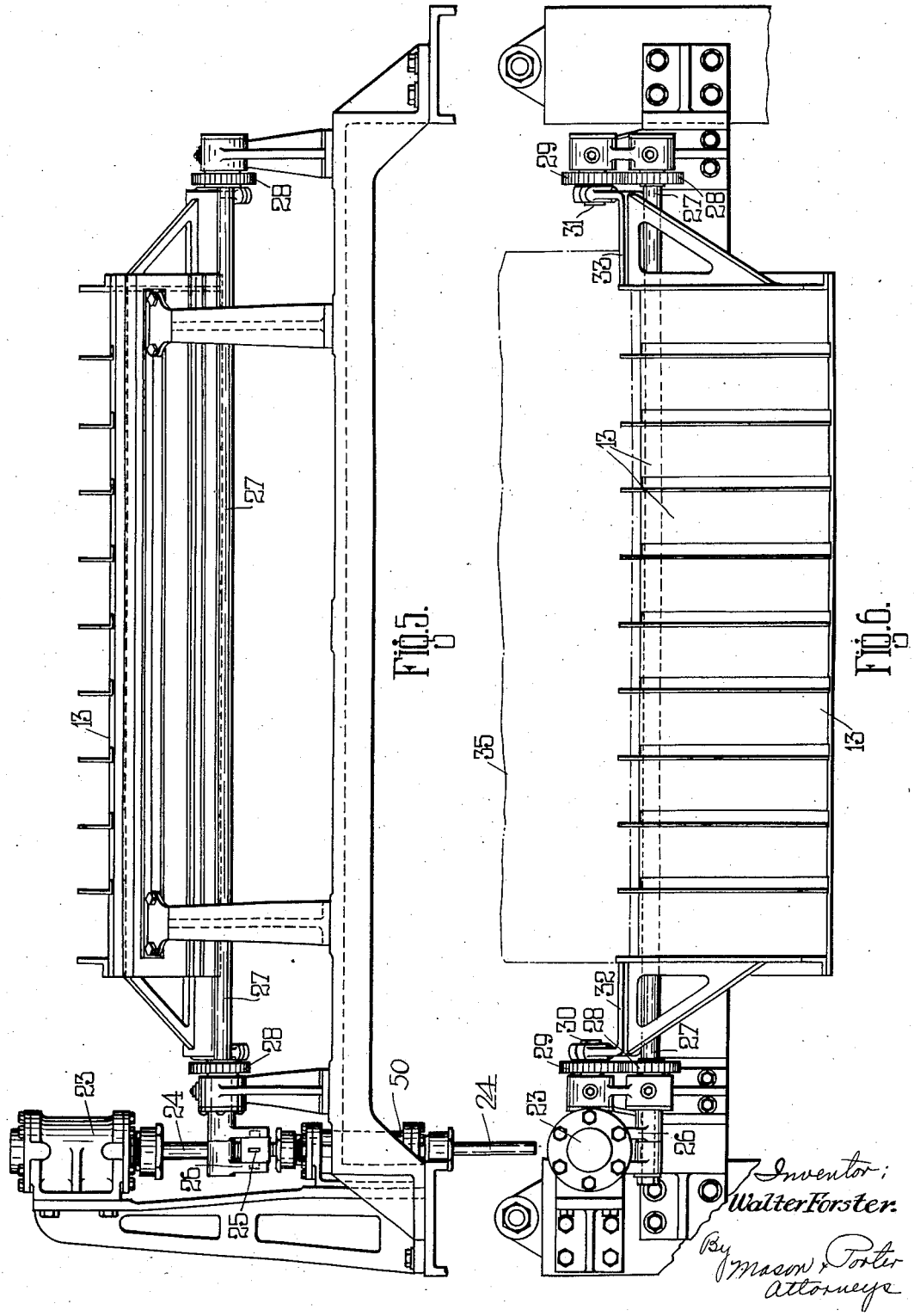

April 14, 1936. W. FORSTER 2,037,623
TRANSFERENCE OF GLASS BOTTLES, JARS AND THE LIKE TO LEERS
Filed April 20, 1935 7 Sheets-Sheet 4

Inventor:
Walter Forster
By: Mason & Porter
Attorneys

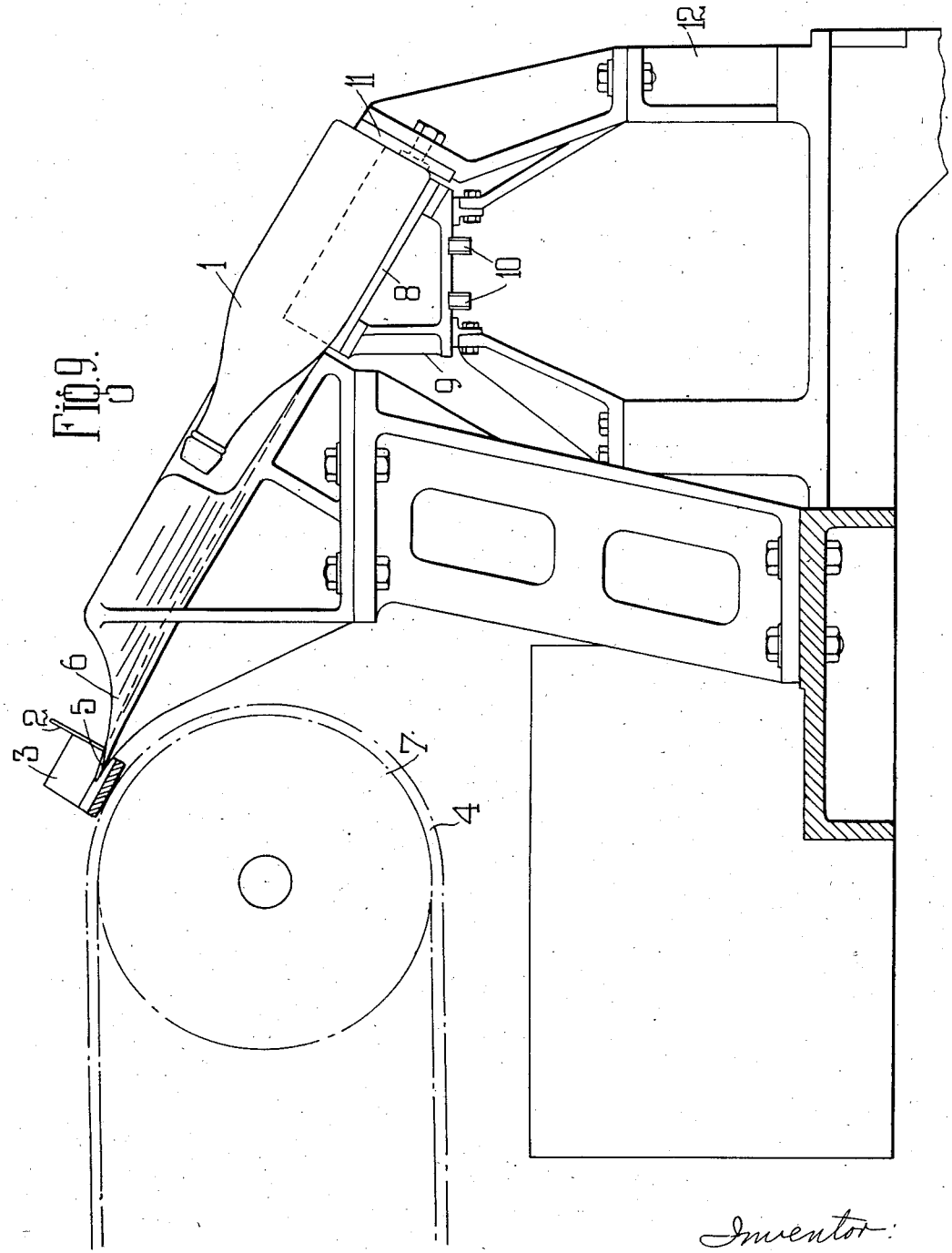

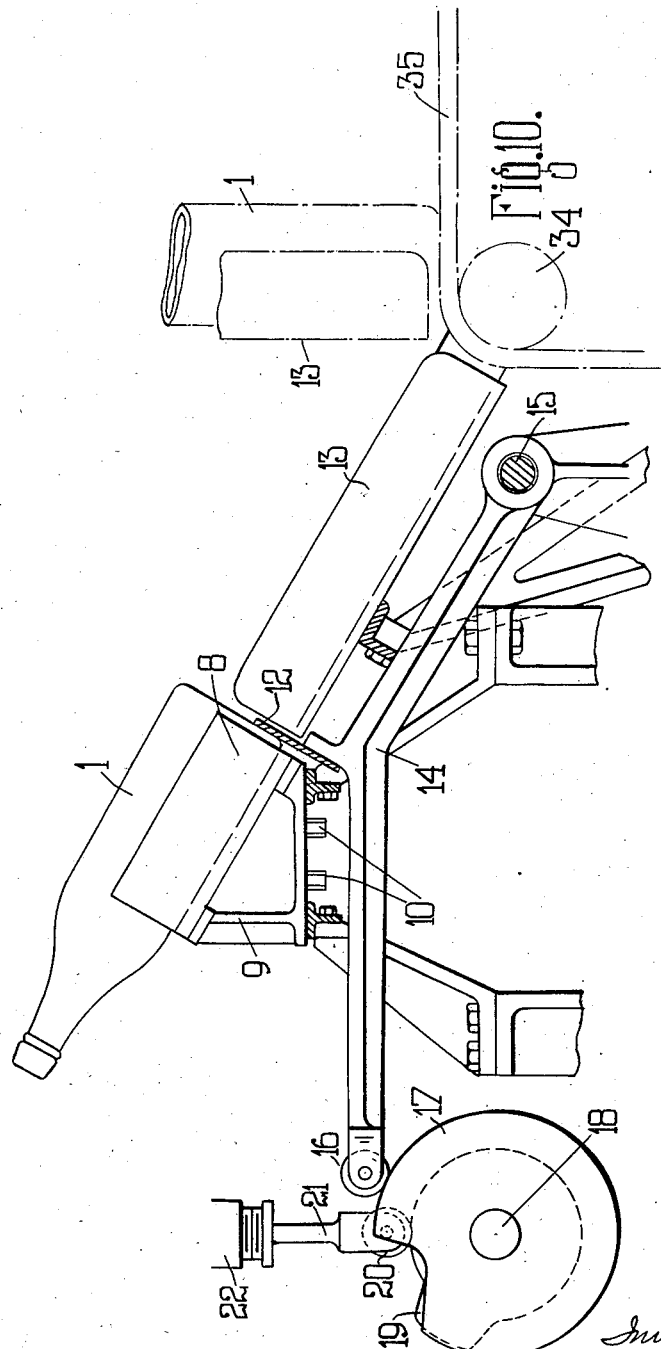

Patented Apr. 14, 1936

2,037,623

UNITED STATES PATENT OFFICE 2,037,623

TRANSFERENCE OF GLASS BOTTLES, JARS, AND THE LIKE TO LEERS

Walter Forster, St. Helens, England

Application April 20, 1935, Serial No. 17,528
In Great Britain February 28, 1934

5 Claims. (Cl. 198—31)

The present invention relates to the transference of glass bottles, jars and the like from bottle making machines to annealing leers.

One object of the invention is to provide means for automatically conveying bottles, jars and the like to leers, and then arranging the same in rows on a leer conveyor.

According to the present invention, glass bottles, jars or the like are conveyed continuously to a leer, are then conveyed intermittently across the mouth of the leer, and are then fed in batches in a direction longitudinal of the leer on to the leer conveyor during intervals in said intermittent displacement across the mouth of the leer.

The invention is more particularly described with reference to the accompanying drawings in which:—

Figure 1 is a plan view of part of the conveying mechanism and the distributing mechanism for the articles across the mouth of the leer.

Figure 2 is a side elevation of one form of conveyor.

Figure 5 is a detail elevation of a tripping mechanism for feeding a charge of distributed articles to the leer.

Figure 6 is a corresponding plan view.

Figure 9 is an end view partly in section of the distributing gear.

Figure 10 is a similar view taken at another point showing the mechanism for transferring the assembled articles to the transfer device.

Figure 11 is a detail side elevation of the conveyor chain.

Figure 12 is a corresponding plan view.

Figure 3:
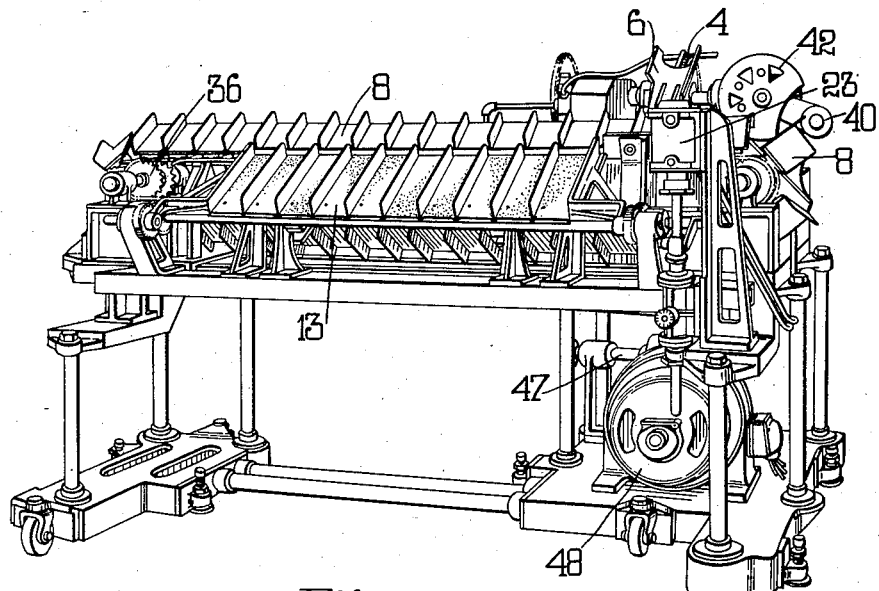
Figure 3 is a perspective view of the back of the distributing mechanism, the leer being removed.
Figure 4:
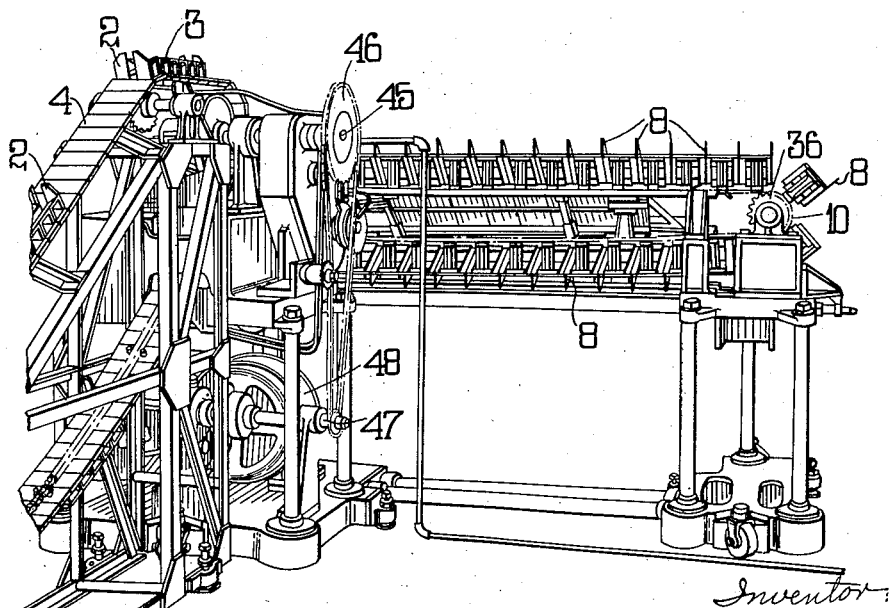
Figure 4 is a corresponding front view of the distributing mechanism corresponding to the plan view of Figure 1.
Figure 7:
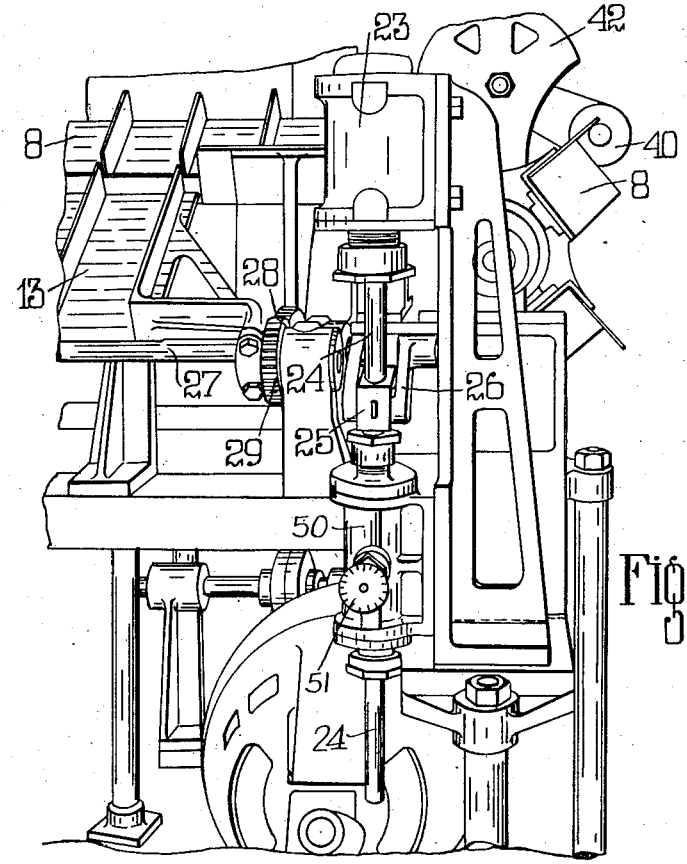
Figure 7 is a rear view of part of the trip mechanism.
Figure 8:
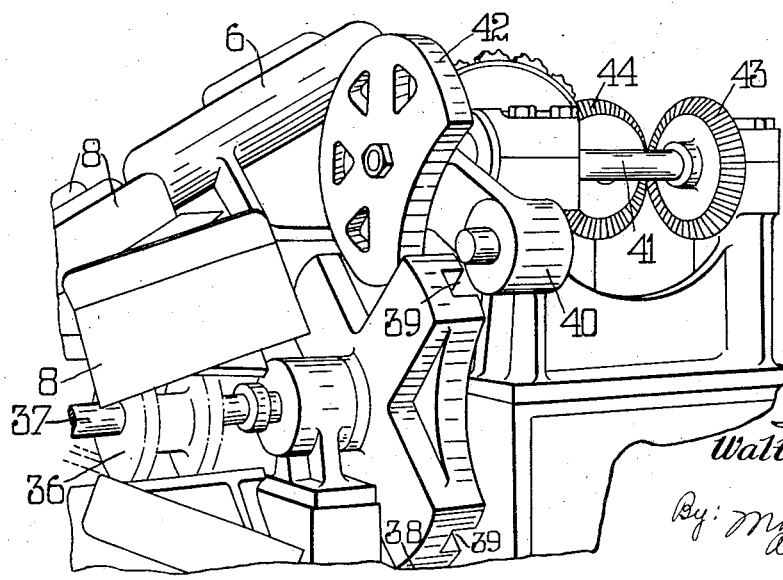
Figure 8 is a detail of a synchronizing device.
Figure 13:
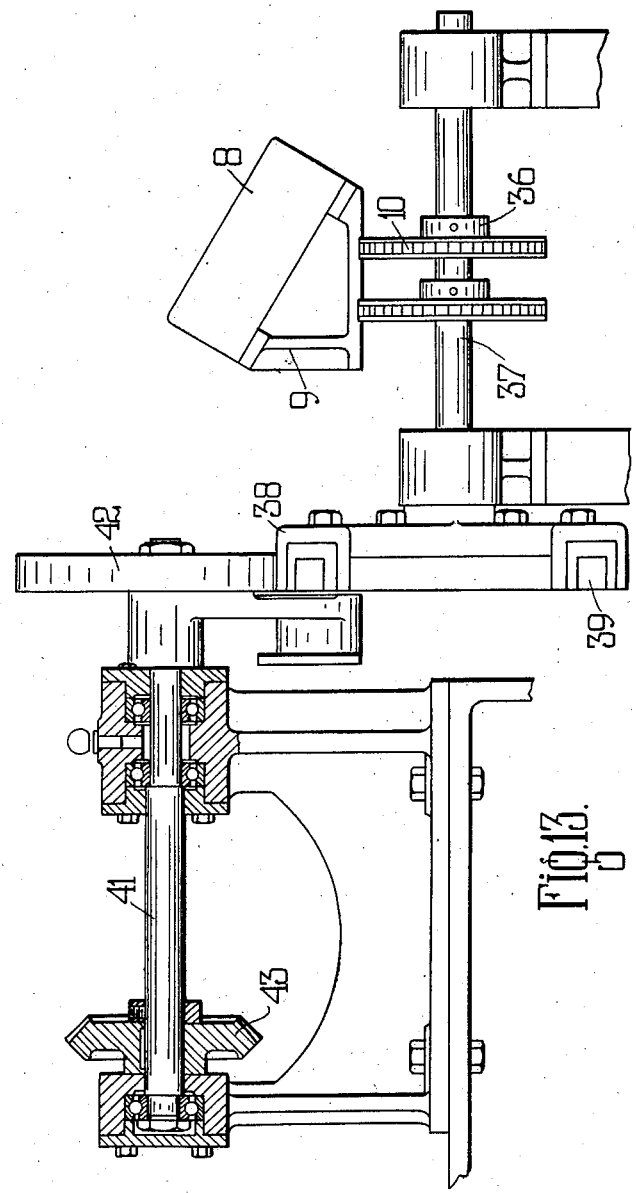
Figure 13 is a detail of driving mechanism.

Bottles, jars, or the like articles 1 to be annealed are fed automatically or by hand, to cradles on an endless conveyor, which cradles consist of end plates 2, and trough members 3 attached to a chain 4. Where the furnaces are disposed at some distance from the leer, the conveyor may have inclined runs as shown in Figure 2, so that the whole space between the bottle or the like making machine is not fully occupied and that therefore, persons can move across the conveyor or other conveyors proceed across this space at right angles to the conveyor chain 4.

The cradle pads 3 are preferably lined with asbestos or the like heat insulating material.

It will be preferred that the end plates 2 of the cradle are slotted to allow passage of a nose-piece 5 on a stationary guide 6, lying in the path of the conveyor chain 4, so that as the chain goes round its sprocket 7, Figure 9, the articles 1 are engaged thereby and can slip into the stationary guide 6, slipping down this one at a time into one or other of a number of compartments 8 on a carriage 9 carried by chains 10. The end of the articles bears against a stationary plate 11 on the frame 12 of the machine. The plate 11 may be spring loaded to absorb the shock of the bottles falling upon it.

The carriage 9 is traversed step by step at right angles to the plane of the conveyor 4 in synchronism with it, so that each time a cradle engages with the nose 5 on the guide 6, a free compartment 8 will lie axially opposite the stationary guide 6 to receive a bottle 1.

A number of the compartments 8 less than the total number on the horizontal flight of the chain 10, have their bases open; that is to say, not closed by stationary plates 11, but temporarily closed by means of movable plates 12 which are removed to withdraw support for the bottles 1, and allow these to pass into a plurality of transfer cradles 13, when a row of bottles have been fed into the compartment 8 of the carriage 9, the full width of the leer.

Any desired means may be provided for withdrawing the temporary supporting plates 12. In the arrangement shown this plate is mounted on a crank lever 14, pivoted at 15 to the frame and carrying a roller 16, cooperating with a continuously rotating cam 17 on a shaft 18. This shaft 18 also carries a cam 19 cooperating with a roller 20 on a plunger 21 operating within a valve chest 22, controlling air or the like pressure fluid to a pneumatic or the like cylinder 23, the piston rod 24 of which is connected to a cross-head 25 having a crank connection 26 to a shaft 27, which shaft 27 has gear wheels 28 upon it meshing with gear wheels 29 on stub shafts 30, 31, which have keyed upon them brackets 32, 33, supporting the transfer cradles.

The piston rod 24 is extended to carry a piston in an oil cylinder 50 forming a dashpot and provided with a control valve 51, whereby the rate of movement of the piston rod 24 over any part of its motion can be adjusted.

It will consequently be seen that as soon as the transfer cradles 13 are filled with bottles or the like 1, these are then tipped automatically about an axis 34 preferably coincident with the turning axis of the leer conveyer 35, so that the articles which have been lying inclined within the transfer cradles 13 are then brought into the position shown in chain dotted lines in Figure 10 to be then conveyed through the leer.

A step by step displacement of the chains 10 supporting the carriages 9 is obtained in that the sprockets 36 of these chains are carried upon a shaft 37, which carries the star element 38 of a Geneva stop motion, the radial guides 39 of which co-operate with a pin on a crank arm 40 keyed to a shaft 41 carrying the other element 42 of the Geneva stop motion. The continuously rotating shaft 41 is driven by bevel gearing 43, 44, from a shaft 45 carrying a sprocket wheel 46 driven from the main driving shaft 47 of the machine from an electric motor or the like geared therewith.

It will consequently be seen that bottles or the like articles from a glass machine received in cradles 3 are picked up one at a time by the nose 5 of the fixed guide 6, which allows them to stop into cradles 8 on a chain 10 displaced step by step across the machine 12, and when a row of bottles 1 are assembled within these cradles, the supports 12 are removed to allow them to fall into the cradles 13, which are then turned up from the position shown in full lines in Figure 10 to the position shown in chain dotted lines, so that thereafter the bottles 1 are conveyed in vertical rows through the leer.

I declare that what I claim is:—

1. A device for transferring glass articles to glass leers, comprising a conveyor for carrying the articles one at a time, a holder inclined with respect to a horizontal plane away from said conveyor, means for moving said holder at right angles to said conveyor, means for transferring the articles from said conveyor to said holder one at a time until a group of articles is assembled on the holder, means for releasing the group of articles from said holder whereby the articles will slide out of the holder, and means for transferring the group of articles released from said holder to the leer in an upright position.

2. A transfer arrangement of glass articles to glass leers comprising a conveyor conveying articles axially one at a time, a number of cradles, means to displace said cradles at an angle to the horizontal step by step at right angles to said conveyor, means to transfer the articles from said conveyor one at a time to successive cradles, means to temporarily support the base of said articles within said cradles, a set of transfer cradles, means to remove said support periodically to allow assembled articles in said first cradles to slide into said set of transfer cradles, and means to rock said transfer cradles about a horizontal pivot to bring the articles from a position inclined to the horizontal to a vertical position with their bases resting on the leer conveyor.

3. A device for transferring glass articles to a glass leer, comprising a conveyor for carrying the articles one at a time, a holder inclined with respect to a horizontal plane away from said conveyor, means for moving said holder at right angles to said conveyor, guide means for transferring the articles from said conveyor to said holder one at a time until a group of articles is assembled on the holder, means for releasing the group of articles from said holder whereby the articles will slide out of the holder, a transfer cradle for receiving the group of articles released from said holder, and means for turning said cradle about a horizontal axis to transfer the articles on the leer in an upright position.

4. A device for transferring glass articles to a glass leer, comprising a conveyor for carrying the articles, a holder inclined with respect to a horizontal plane away from said conveyor, said holder having a plurality of compartments for individual articles, means for moving said holder at right angles to said conveyor, means including a stationary guide for transferring the articles one at a time to each compartment on said holder until a group of articles is assembled thereon, means for releasing the group of articles from said holder whereby the articles will slide out of said compartments, a transfer cradle for receiving the group of articles released from said holder, and means for turning said cradle about a horizontal axis to transfer the articles to the leer in an upright position.

5. A device for transferring glass articles to a glass leer, comprising a conveyor for carrying the articles, a holder inclined with respect to a horizontal plane away from said conveyor, means for transferring the articles from said conveyor to said holder, means for releasing the articles from said holder whereby they will slide out of the holder, a transfer cradle for assembling a group of articles released from said holder, pneumatic means for oscillating said cradle about a horizontal axis to bring the articles to the leer conveyor in an upright position, and a dashpot control for said pneumatic means whereby the rate of movement thereof can be adjusted as desired.

WALTER FORSTER.